US007874791B2

(12) United States Patent
Ferber et al.

(10) Patent No.: US 7,874,791 B2
(45) Date of Patent: Jan. 25, 2011

(54) TURBOMACHINE

(75) Inventors: Joergen Ferber, Wutoeschingen (DE); James Ritchie, Ennetbaden (CH)

(73) Assignee: ALSTOM Technology Ltd., Baden (CH)

( * ) Notice: Subject to any disclaimer, the term of this patent is extended or adjusted under 35 U.S.C. 154(b) by 962 days.

(21) Appl. No.: 11/530,065

(22) Filed: Sep. 8, 2006

(65) Prior Publication Data

US 2007/0212215 A1     Sep. 13, 2007

(30) Foreign Application Priority Data

Sep. 15, 2005    (CH)    ................... 01510/05

(51) Int. Cl.
F01D 5/22     (2006.01)
F01D 9/04     (2006.01)
F01D 5/30     (2006.01)

(52) U.S. Cl. .................... 415/137; 415/210.1; 416/191; 416/195

(58) Field of Classification Search ................. 415/115, 415/136, 137, 173.6, 209.3, 209.4, 210.1; 416/92, 97 R, 181, 189, 191, 195, 196 R
See application file for complete search history.

(56) References Cited

U.S. PATENT DOCUMENTS

| | | | |
|---|---|---|---|
| 1,423,466 A | | 7/1922 | Snyder |
| 2,402,418 A | * | 6/1946 | Kroon ......................... 415/137 |
| 2,952,442 A | * | 9/1960 | Warnken ..................... 416/190 |
| 2,971,743 A | * | 2/1961 | Welsh ......................... 416/191 |
| 3,290,004 A | | 12/1966 | Ishibashi |
| 3,314,652 A | | 4/1967 | Geberth, Jr. et al. |
| 3,985,465 A | | 10/1976 | Sheldon et al. |
| 4,243,360 A | * | 1/1981 | Wright ........................ 416/191 |
| 4,538,331 A | | 9/1985 | Egan et al. |
| 4,592,120 A | | 6/1986 | Egan et al. |
| 4,832,568 A | | 5/1989 | Roth et al. |

(Continued)

FOREIGN PATENT DOCUMENTS

DE          3341871          5/1985

(Continued)

OTHER PUBLICATIONS

Search Report for EP Patent App. No. 06119287.8 (Jan. 31, 2007).

(Continued)

*Primary Examiner*—Nathaniel Wiehe
(74) *Attorney, Agent, or Firm*—Cermak Nakajima LLP; Adam J. Cermak

(57) ABSTRACT

A turbomachine (1), in particular a turbine or compressor, includes a rotor (2) which has at least one moving blade row (4) with a plurality of moving blades (5), and a stator (3) which has at least one guide vane row (6) with a plurality of guide vanes (7), at least in one of the blade or vane rows (4, 6) all the blades or vanes (5, 7) each having a shroud plate (10). In order to simplify the maintenance of the turbo-machine (1), the shroud plates (10) are separate components with respect to the respective blade or vane (5, 7) and are mounted on the respective blade or vane (5, 7), shroud plates (10) adjacent in the circumferential direction (9) being coupled to one another for the transmission of tensile forces in the circumferential direction (9).

13 Claims, 3 Drawing Sheets

U.S. PATENT DOCUMENTS

| | | | |
|---|---|---|---|
| 4,948,338 A * | 8/1990 | Wickerson | 416/92 |
| 4,987,736 A | 1/1991 | Ciokajlo et al. | |
| 5,113,583 A | 5/1992 | Jenkel et al. | |
| 5,690,469 A * | 11/1997 | Deal et al. | 415/189 |
| 5,743,322 A | 4/1998 | Jackson et al. | |
| 5,904,201 A | 5/1999 | Jackson et al. | |
| 6,219,916 B1 | 4/2001 | Walker et al. | |
| 6,325,871 B1 | 12/2001 | Burke et al. | |
| 6,616,408 B1 | 9/2003 | Meier | |

FOREIGN PATENT DOCUMENTS

| | | |
|---|---|---|
| EP | 0285778 | 10/1988 |
| EP | 0712995 | 5/1996 |
| GB | 847054 | 9/1960 |
| GB | 1509185 | 5/1978 |
| JP | 2001200701 | 7/1927 |

OTHER PUBLICATIONS

Search Report for Swiss App. No. CH 1510/2005 (Nov. 9, 2005).

* cited by examiner

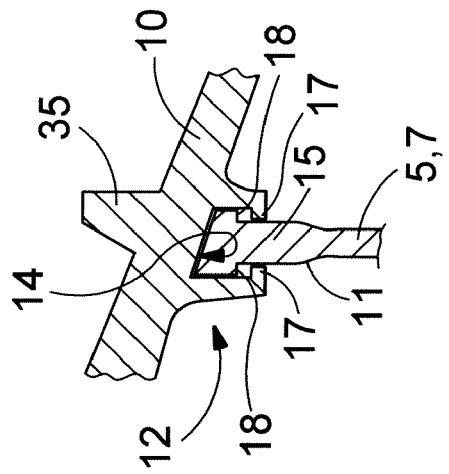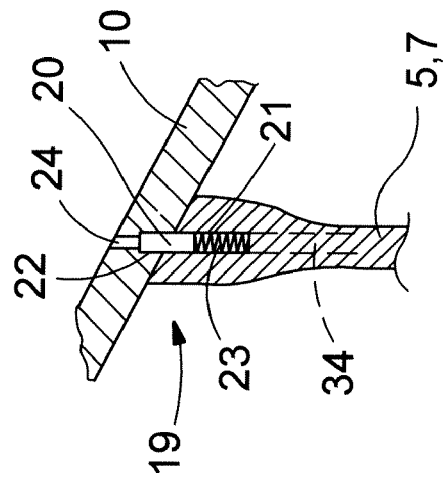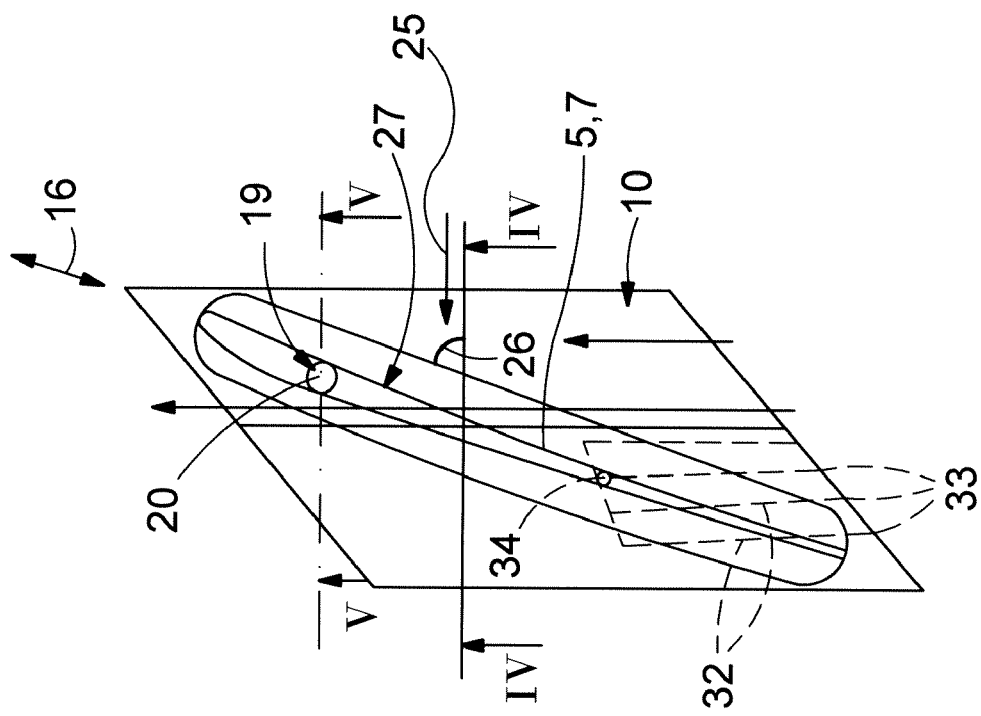

TURBOMACHINE

This application claims priority under 35 U.S.C. §119 to Swiss patent application number 01510/05, filed 15 Sep. 2005, the entirety of which is incorporated by reference herein.

BACKGROUND OF THE INVENTION

1. Field of the Invention

The present invention relates to a turbomachine, in particular a turbine or a compressor, and, moreover, to a shroud plate for blades or vanes of a turbomachine of this type.

2. Brief Description of the Related Art

Turbomachines, such as turbines, in particular gas turbines and steam turbines, and also compressors, include a rotor which is mounted rotatably in a fixed stator. Turbomachines of this type are also designated as rotating turbomachines. The rotor in this case usually includes a plurality of moving blade rows which each include a plurality of moving blades. Correspondingly, the stator normally has a plurality of guide vane rows which each include a plurality of guide vanes.

In this context, it is basically known to provide the moving blade rows and/or the guide vane rows with a shroud which has a plurality of shroud portions or shroud plates formed in each case on one of the blades or vanes. The multimembered shroud thus formed possesses an annular arrangement in the mounted state. Within the shroud, the free blade or vane ends of adjacent blades or vanes within the same blade or vane row are supported against one another via the shroud plates. With the aid of shrouds of this type, the axial sealing off and the aerodynamics of the respective blade or vane row can be improved, thus increasing the efficiency of the turbomachine equipped with them. Furthermore, shrouds of this type lead to stabilization via coupling in the form of a mutual circumferential support of large blades or vanes which, because of their radial length, exhibit a certain tendency to oscillate when the turbomachine is in operation.

U.S. Pat. No. 6,616,408 B1 discloses a method for the production of a blade or vane, in which the respective blade or vane is assembled from a plurality of individual parts by means of a high-frequency induction welding operation. A first end part having a blade or vane root and a second end part having a shroud plate are welded to a middle part having the blade or vane profile.

EP 0 285 778 B1 shows a blade or vane which has at its head a shroud plate, that is to say a shroud portion assigned to the blade or vane. In this case, the shroud plate is cast onto the blade or vane head so as to obtain a blade or vane with an integrated shroud plate. For the purpose of better mechanical anchoring between the cast-on shroud plate and the blade or vane, the blade or vane head may have, in the region to be cast around, an undercut contour which is filled during the casting of the shroud plate.

It is known in each case from U.S. Pat. No. 4,538,331 and from U.S. Pat. No. 4,592,120 to produce a rotor portion having integrally a moving blade row by the rotor portion being cast into a casting mold fitted with the moving blades. For this purpose, the moving blades are equipped with a dovetail-like root which projects into the casting mold cavity to be filled and which is embedded into the casting material during the casting of the rotor portion. In this case, a fusion connection occurs between the rotor portion and the respective moving blade.

U.S. Pat. No. 5,113,583 discloses a further method for the production of a rotor portion equipped integrally with moving blades, in which deformable hollow monocrystal blades are arranged, with the exception of a root portion, in a ceramic protective sheath, while, within the framework of an isostatic forging operation, the rotor portion is connected to the root portions of the moving blades by means of a diffusion bonding process taking place at high temperatures and under high pressures.

U.S. Pat. No. 5,904,201 discloses a method for the integral forming of a prolongation on a structural part, such as, for example, a turbine blade. For example, to repair a blade tip, the blade can be dipped from above, with its tip forward, into a melt which preferably includes the alloying material of the blade. In the region of the blade end dipped into the melt, a growth zone is formed, in which the transition between the liquid phase of the melt and the solid phase of the blade takes place. By the blade being drawn slowly out of the melt upward, the blade grows due to the phase transition taking place continuously in the growth zone. To produce a special geometry, ceramic molds may be used, which are arranged in the region of the growth zone.

A further method for the production of an integral prolongation on a structural part, preferably on a turbine blade, is known from U.S. Pat. No. 5,473,322. There, for example for the repair of a blade tip, a ceramic mold is mounted on the blade in the region of the blade tip, in such a way that the blade tip to be prolonged closes off the mold downward while the mold is open upward. The mold is then filled with a melt, preferably consisting of the alloying material of the blade, and a growth zone, in which phase transition takes place, can thereby be formed again in the region of the blade tip. By the blade being lowered slowly or by the mold being raised slowly, the desired growth of the blade can be achieved.

U.S. Pat. No. 6,325,871 B1 discloses a method for the connection of two structural parts formed of superalloy. The structural parts may be two halves of a gas turbine blade which are preferably produced as monocrystals.

U.S. Pat. No. 6,219,916 B1 discloses a method for the production of a rotor portion having integral moving blades. For fastening the individual moving blades, the rotor portion is provided with a linear groove and the moving blade is provided with a root shaped complementarily to the groove. The moving blade can then be connected to the rotor portion by means of linear friction welding.

Insofar as the shrouds are used as axial seals for individual blade rows, they may be exposed to increased wear, with the result that repairs are required. Since the individual shroud plates or shroud portions, which in their entirety form the respective shroud in the mounted state, form an integral part of the associated blade, high repair costs are incurred, since the entire blade has to be repaired and, if appropriate, exchanged.

Furthermore, in the case of moving blades, the individual shroud portions or shroud plates are exposed to extreme centrifugal forces. Moving blades which have an integral shroud plate are under a correspondingly high tensile load, with the result that the service life of the individual moving blade is reduced. The moving blades therefore have to be exchanged earlier.

SUMMARY OF THE INVENTION

The invention is intended to remedy this. One aspect of the present invention is concerned with the problem of specifying, for a turbomachine of the aforementioned type, an improved embodiment which is distinguished particularly by reduced operating costs or maintenance costs.

Another aspect of the present invention includes the general idea of coupling the shroud plates forming the shroud to one another in such a way that they can transmit tensile forces between one another in the circumferential direction. With a corresponding arrangement on the respective blades or vanes, a self-supporting structure for the shroud can thereby be achieved, at least in the case of moving blades, when the turbomachine is in operation. The self-supporting shroud thus formed can absorb in itself the forces occurring during operation, particularly in the case of a moving blade row, without in this case subjecting the blades to load. This is achieved by means of the circumferentially closed continuous tensile force coupling of adjacent shroud plates to one another, with the result that the centrifugal forces which occur are converted into tangential tensile stresses. So that the shroud plates can be mounted on the blades, the shroud plates must be components produced separately from the blades. The separate production of the shroud plates makes it possible to use a material which differs from that of the blades and/or a material structure which differs from that of the blades. For example, the shroud plates may be optimized in terms of tensile load in the circumferential direction, while the blades are conventionally optimized in terms of tensile load in the radial direction.

A multimembered self-supporting shroud ring embodying principles of the present invention has the advantage, when used in a moving blade row, that it can absorb in itself the centrifugal forces occurring during operation, without a significant additional radial tensile load on the moving blades in this case arising. The lifetime of the moving blades is thereby increased. The moving blades may likewise have a lower dimensioning, which can be utilized for a weight reduction increasing the efficiency of the turbomachine.

Furthermore, the shroud plates designed as separate components can readily be formed in such a way that they can be demounted comparatively simply again. This simplifies the repair or replacement of the shroud plates in the event of wear phenomena. This is advantageous particularly in the case of rotor portions having integrated moving blades.

A further advantage is seen in that these shroud plates are basically retrofittable. Blade rows of a turbo-machine can thereby be provided with a shroud at a later stage in a comparatively cost-effective way, so that the advantages of a shroud, to be precise, the stabilization of long blades via coupling and an increase in efficiency due to reduced leakages and improved aerodynamics, can thereby be utilized.

In a preferred embodiment, the shroud plates may be mounted on the respective blades in such a way that they are freely movable radially with respect to the blades or vanes. That is to say, the shroud plates are not fixed to the blades in the radial direction, but, instead, are arranged freely movably or loosely in relation to these, preferably within defined limits. Thus, for example, thermally induced stresses can also be reduced. This type of construction, using the shroud plates, is particularly advantageous in a moving blade row. The centrifugal forces arising during operation force the shroud plates radially outward. Owing to the degree of freedom provided in the radial direction, the shroud plates can basically lift off from the associated moving blades in the radial direction, without tensile forces in this case being transmitted between the shroud plates and the moving blades. The moving blades are thus decoupled from the shroud plates in terms of the centrifugal forces.

Further important features and advantages of the turbomachine according to the invention may be gathered from the drawings and from the accompanying figure description with reference to the drawings.

BRIEF DESCRIPTION OF THE DRAWINGS

Preferred exemplary embodiments of the invention are illustrated in the drawings and are explained in more detail in the following description, identical reference symbols referring to identical or similar or functionally identical components. In the drawings, in each case diagrammatically, FIG. 3 shows a view in the radial direction in the region of a blade according to an arrow III in FIG. 1 or in FIG. 2, FIG. 4 shows a longitudinal section through the blade in the region of a shroud plate according to the sectional lines IV in FIG. 3, FIG. 5 shows a view, as in FIG. 4, but in another sectional plane according to the sectional lines V in FIG. 3, FIGS. 6 to 10 show axial views of a contact region of adjacent shroud plates in various embodiments.

DETAILED DESCRIPTION OF EXEMPLARY EMBODIMENTS

Figure 2:
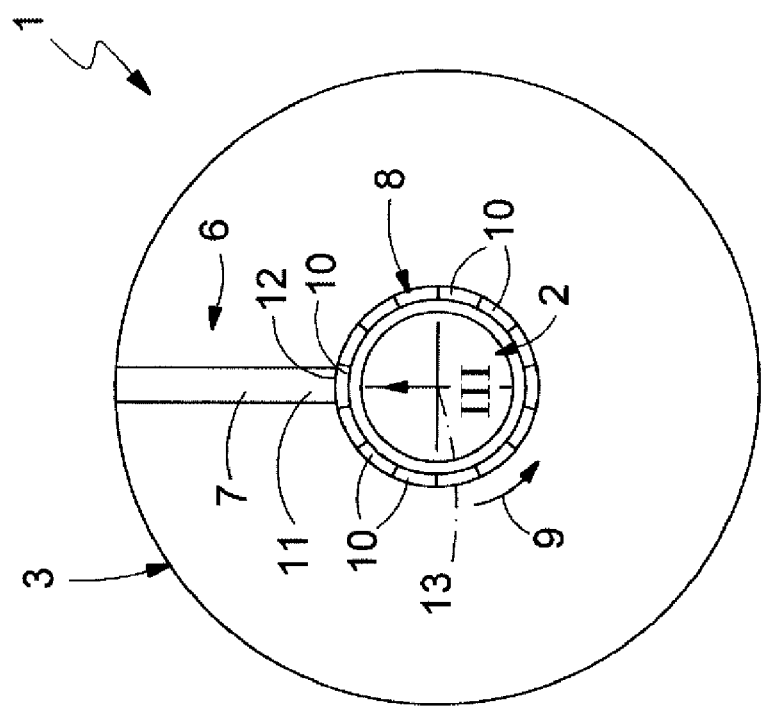
FIG. 2 shows a view, as in FIG. 1, but in another sectional plane or embodiment.
Figure 1:
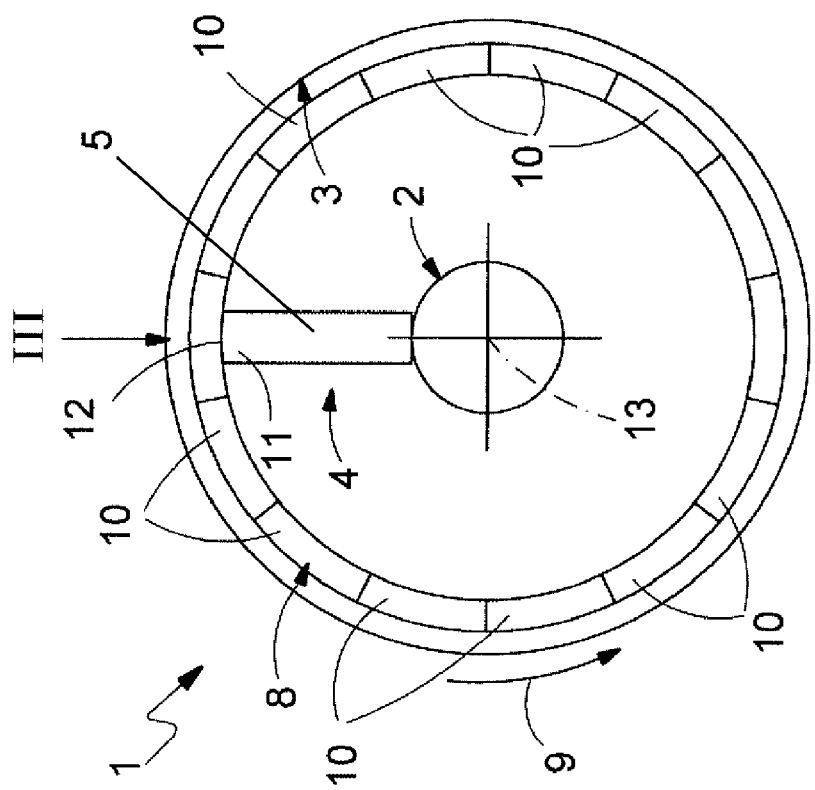
FIG. 1 shows a greatly simplified basic cross section through a turbomachine in the region of a blade row.

According to FIGS. 1 and 2, a turbomachine 1 is equipped with a rotor 2 and with a stator 3. The rotor 2 is mounted rotatably in the stator 3 in the usual way. The turbomachine 1 may basically be a compressor or a turbine. Where a turbine is concerned, this may be a steam turbine or a gas turbine. The turbomachine 1 may be stationary and serve, for example in a power plant, for driving a generator. The turbomachine 1 may likewise be a drive assembly in a vehicle, in particular in an aircraft. Preferably, however, the invention is implemented by the turbomachine 1 being designed as a stationary gas turbine.

According to FIG. 1, the rotor 2 has at least one moving blade row 4 which includes a plurality of moving blades 5. The cross section according to FIG. 1 lies in the region of such a moving blade row 4, although only a single moving blade 5 is illustrated for clarity. In contrast to this, according to FIG. 2, the stator 3 has at least one guide vane row 6 which includes a plurality of guide vanes 7. The section according to FIG. 2 in this case passes through such a guide vane row 6, only a single guide vane 7 being reproduced for clarity.

The turbomachine 1 is equipped with at least one shroud 8 which extends, closed, in the circumferential direction indicated by an arrow 9 and which is assigned to one of the blade or vane rows 4, 6. In this case, this shroud 8 is formed from a plurality of individual shroud portions or shroud plates 10 which are adjacent in the circumferential direction 9 and which are arranged in each case at the head 11 of the associated blade or vane 5, 7. Each blade or vane 5, 7 carries such a shroud plate 10. In the embodiment shown in FIG. 1, the shroud 8 is assigned to the moving blade row 4, with the result that the shroud plates 10 are arranged at the outer ends, remote from the rotor 2, of the moving blades 5. In contrast to this, in the embodiment according to FIG. 2, the shroud 8 is assigned to the guide vane row 6, and the shroud plates 10 are correspondingly arranged at the radially inner ends, facing the rotor 2, of the guide vanes 7.

The respective shroud plate 10 is preferably produced from one piece, for example by casting or forging. According to the invention, the shroud plate 10 forms a separate component which is produced independently of the respective blade or vane 5, 7 and, for mounting, is mounted onto the blade or vane 5, 7. For this purpose, the shroud plates 10 and the blades or vanes 5, 7 are arranged against one another by means of holding devices 12. In this case, each shroud plate 10 is in each case attached separately to the associated blade or vane 5, 7 by means of such a holding device 12.

These holding devices 12 are in this case configured such that they allow relative movements between the shroud plate 10 and the blade or vane 5, 7 in the radial direction. Moreover, the holding devices 12 are preferably configured such that they can be released nondestructively. In other words, the mounted shroud plates 10 can be demounted without the shroud plates 10 being destroyed and without the blades or vanes 5, 7 being destroyed. This is a critical cost benefit for the later mounting of repaired or new shroud plates 10.

The holding devices 12 can also be configured such that, in the mounted state, the shroud plates 10 are in each case fixed in the circumferential direction 9 and/or in the axial direction with respect to the blades or vanes 5, 7, that is to say parallel to the axis of rotation 13 of the rotor 2. A defined fixing in position of the shroud plates 10 in relation to the associated blades or vanes 5, 7 is thereby achieved transversely to the radial direction.

According to FIGS. 3 and 4, a holding device 12 of this type may have, for example, a receptacle 14 which is formed on the shroud plate 10 and into which is inserted a holding member 15 formed on the respective blade or vane 5, 7. The receptacle 14 in this case is in the form of a longitudinal groove open on one side, which extends in a mounting direction 16 indicated in FIG. 3 by a double arrow. The receptacle 14 has on its open side two inwardly projecting edge portions 17 which form an undercut with respect to the radial direction. The holding member 15 is shaped complementarily to the receptacle 14 and possesses steps 18 laterally projecting correspondingly to the edge portions 17. By means of radial play between the edge portions 17 and the steps 18, the holding element 15 is held movably in the radial direction in relation to the receptacle 14. The holding member 15 is fixed in the receptacle 14 transversely to the mounting direction 16 and transversely to the radial direction, while relative adjustment between the holding member 15 and receptacle 14 is basically possible in the mounting direction 16. The holding member 15 is formed here by an integral part of the blade or vane 5, 7. The blade or vane head 11 is preferably shaped as a holding member 15.

The holding device 12 is configured with respect to the mounting direction 16 as a sliding seat or sliding mounting which makes it possible to mount the shroud plate 10 particularly simply on the associated blade or vane 5, 7 and to demount it nondestructively from the latter again.

According to FIG. 5, each blade or vane 5, 7 provided with the shroud plate 10 may have at least one securing device 19 which secures the relative position between the respective shroud plate 10 and the associated blade or vane 5, 7 transversely to the radial direction and therefore particularly in the mounting direction 16. The securing device 19 is in this case formed radially between the shroud plate 10 and the respective blade or vane 5, 7, virtually within the holding device 12.

The securing device 19 includes a securing member 20. This is arranged so as to be movable transversely to the mounting direction 16, here in the radial direction, on the blade or vane 5, 7 or on its blade or vane head 11. For this purpose, the blade or vane 5, 7 contains a guide orifice 21 shaped complementarily to the securing member 20. Moreover, the shroud plate 10 contains a securing orifice 22 which is arranged in alignment with the guide orifice 21. The securing member 20, which, for example, is a cylindrical bolt, is coordinated with the guide orifice 21 and with the securing orifice 22 such that the securing member 20 can penetrate into the securing orifice 22 as soon as there is alignment between the guide orifice 21 and securing orifice 22. The guide orifice 21 and securing orifice 22 are shaped complementarily to the securing member 20, that is to say, for example, cylindrically. The desired fixing in position is achieved as soon as the securing member 20 projects partially into the securing orifice 22 and partially into the guide orifice 21, with the result that a positive connection is obtained.

The securing device 19 may have a securing spring 23 which is arranged, for example, in the guide orifice 21 and which prestresses the securing member 20 into the securing position. The securing orifice 22 preferably contains a stop, not designated in any more detail, which limits the depth of penetration of the securing member 20. Furthermore, here, the securing device 19 includes a desecuring orifice 24 which is formed in the shroud plate 10 and which is expediently arranged coaxially to the securing orifice 22. By means of a suitable tool, then, through the desecuring orifice 24, the securing member 20 can be driven out of the securing orifice 22 and into the guide orifice 21.

According to FIG. 3, the holding device 12 is expediently configured such that its receptacle 14 has an inclination with respect to the axial direction, represented by an arrow 25. Correspondingly, the longitudinal direction of the receptacle 14 extends at an inclination with respect to the axial direction 25. In this case, an angle of inclination is designated by 26. Owing to the inclined orientation of the receptacle 14, the holding device 12 can additionally transmit circumferential forces and axial forces between the shroud plate 10 and the respective blade or vane 5, 7.

Owing to the integral design of the holding member 15 and of the blade or vane head 11, the longitudinal direction of the receptacle 14 is inclined approximately in the same way as a profile 27 of the blade or vane 5, 7. The angle of inclination 26 then corresponds approximately to an angle of incidence, not designated in any more detail, of the blade or vane profile 27. In this embodiment, a particularly long length is obtained for the holding device 12 in its mounting direction 16, that is to say parallel to the longitudinal direction of the receptacle 14, this being advantageous for mounting. At the same time, the holding device 12 can thereby be integrated largely into the outer contour of the blade or vane 5, 7. Its blade or vane head 11 therefore has to be enlarged only comparatively slightly by a thickened cross section in order to form the holding member 15. The holding device 12 thus has a comparatively slender build.

According to another aspect of the present invention, the shroud plates 10 adjacent in the circumferential direction 9 within the respective blade or vane row 4, 6 are coupled to one another in such a way that they can transmit tensile forces between one another in the circumferential direction 9. For this purpose, where two adjacent shroud plates 10 are adjacent to one another in the circumferential direction 9, a coupling region 28 is formed, which makes it possible to transmit circumferential forces between the adjacent shroud plates 10. In this coupling region 28, the in each case adjacent shroud plates 10 are positively in engagement with one another in the circumferential direction 9. In this case, this positive engagement may take place directly between the two adjacent shroud plates 10, as in the embodiments of FIGS. 6 to 8, or indirectly via an additional coupling member 29, as in the embodiment according to FIG. 9.

Figure 6:
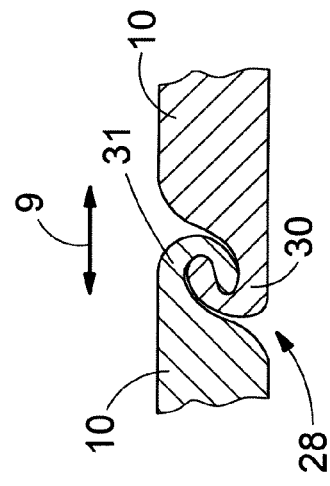
Figure 8:
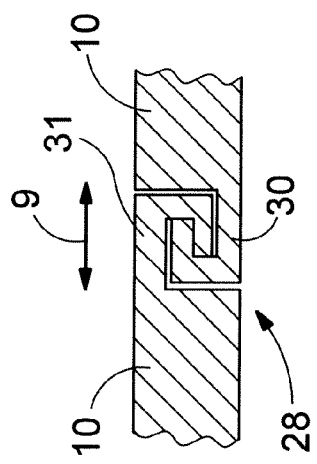
Figure 7:
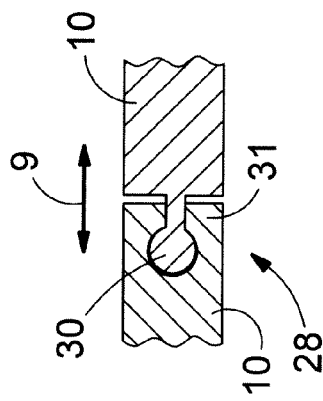

In the embodiments of FIGS. 6 to 8 with direct positive engagement between the adjacent shroud plates 10, each shroud plate 10 has in the circumferential direction 9, at one end, a first holding contour 30 and, at its circumferentially other end, a second holding contour 31. These holding contours 30, 31 are configured complementarily to one another in such a way that they can be brought into engagement with one another for the transmission of tensile forces in the circumferential direction 9, in order to make a positive connection in the circumferential direction 9. There is basically the possibility of any desired variations for the actual configuration of these holding contours 30, 31, and therefore only a few exemplary embodiments are indicated here, although this does not, in this respect, restrict the generality of the present invention. In FIGS. 6 and 7, the holding contours 30, 31 have a U-shaped profile, while, in the embodiment according to FIG. 8, the first holding contour 30 is configured as piping, while the second holding contour 31 forms a piping receptacle.

Figure 9:
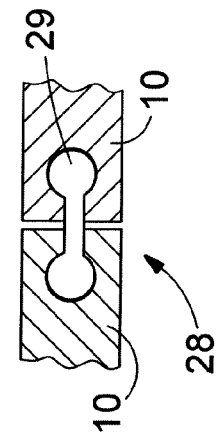

In the embodiment according to FIG. 9, the transmission of tensile force is achieved with the aid of the coupling member 29 which constitutes an additional separate component. For example, this coupling member 29 is configured here as double piping which is shaped complementarily to the two holding contours 30, 31 configured in each case as a piping receptacle.

Figure 10:
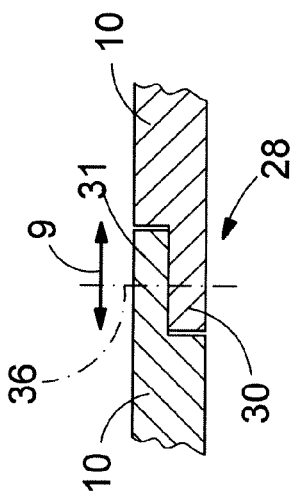

According to FIG. 10, it is also basically possible to fasten adjacent shroud plates 10 to one another in the coupling region 28, that is to say, in the region of the circumferential ends adjacent to one another. A corresponding fastening is indicated here merely by a dashed and dotted line and designated by 36 and may be designed, for example, as a rivet connection or as a screw connection. The respective fastening 36 is oriented radially here by way of example and is preferably designed such that the transmission of tensile force in the circumferential direction 9 takes place by means of a non-positive connection, that is to say by means of the static friction due to the holding contours 30, 31 braced against one another with the aid of the fastening 36.

The individual shroud plates 10 are thus, on the one hand, held movably in the radial direction on their associated blade or vane 5, 7, while, on the other hand, they form with the adjacent shroud plates 10 a composite structure which is tension-resistant in the circumferential direction 9. Insofar as the shroud plates 10 are mounted on moving blades 5 of a moving blade row 4, the measures mentioned result in the following effect: as soon as the centrifugal forces take effect due to the rotation of the rotor 2, these begin to drive the individual shroud plates 10 radially outward. Since the individual shroud plates 10 are held radially movably on the associated moving blades 5, the shroud plates 10 can basically lift off radially from their moving blades 5. As a result of this, however, the diameter of the shroud 8, which is formed from the composite structure of the shroud plates 10 coupled to one another in the circumferential direction, increases. This increase in diameter, however, is counteracted by the tension-resistant couplings within the composite structure of the shroud plates. A circumferential bracing of the shroud plates 10 coupled to one another consequently occurs, with the result that a self-supporting annularly closed shroud ring is formed. This shroud ring includes the individual shroud plates 10 and to that extent is multimembered. This structure, self-supporting during rotation, of the composite structure of the shroud plates converts the centrifugal forces acting on the shroud plates 10 into circumferential forces and can absorb these in itself. Thus, the individual moving blades 5 are relieved of the centrifugal forces acting on the shroud plates 10 or are decoupled from the shroud plates 10 in terms of the transmission of centrifugal forces.

According to FIGS. 3 and 5, in special embodiments, the respective shroud plate 10 may additionally contain cooling duct structures 32 which are indicated here merely diagrammatically by broken lines. These cooling duct structures 32 serve for cooling the shroud plate 10 and, for example, may form a coolant path remaining inside the shroud plate 10 and/or have outlet ports 33 which terminate on the surface of the shroud plate 10 and through which coolant can emerge also so as to form a cooling film on the surface of the shroud plate 10. In the mounted state, the cooling duct structures 32 of the shroud plate 10 communicate with cooling duct structures 34 which are formed inside the respective blade or vane 5, 7. The cooling duct structures 32 of the shroud plate 10 are thereby supplied with coolant via the cooling duct structures 34 of the blade or vane 5, 7. In this case, the separate type of construction, independent of the blades or vanes 5, 7, of the shroud plate 10 is beneficial to the formation of complex cooling duct structures 32 in the shroud plate 10, since these can be produced in the shroud plate 10 before the latter is mounted on the blades or vanes 5, 7. It is clear that suitable sealing means, not shown here, may be provided for the fluidic coupling of the shroud-side cooling duct structures 32 to the blade-side cooling duct structures 34.

According to FIG. 4, in a development of the invention, the shroud plate 10 may be equipped with a sealing structure 35. This is in this case arranged on a side of the shroud plate 10 which faces away from the blades or vanes 5, 7. The sealing structure 35 is likewise merely indicated here and, for example, is in the form of a radially projecting web extending in the circumferential direction 9, what is known as a fin. When the turbomachine 1 is in operation, the sealing structure 35 cooperates with a radially adjacent wall either of the rotor 2 or of the stator 3 so as to form an axial seal for the respective blade or vane row 4, 6. For example, the web indicated in FIG. 4 penetrates into a corresponding annular groove, in order thereby to bring about the effect of a labyrinth seal. There are many models for the configuration of sealing structures 35 of this type in the prior art, and therefore these do not have to be dealt with in any more detail here. Other sealing structures 35 are, for example, a brushing structure which cooperates with a brushable counter structure, one of these structures forming the sealing structure 35 of the shroud plate 10, while the other structure is then formed on the rotor 2 or on the stator 3.

LIST OF REFERENCE SYMBOLS

1 Turbomachine
2 Rotor
3 Stator
4 Moving blade row
5 Moving blade
6 Guide vane row
7 Guide vane
8 Shroud
9 Circumferential direction
10 Shroud plate
11 Blade or vane head
12 Holding device
13 Axis of rotation
14 Receptacle
15 Holding member
16 Mounting direction
17 Edge region
18 Step
19 Securing device
20 Securing member
21 Guide orifice
22 Securing orifice
23 Securing spring 24 Desecuring orifice
25 Axial direction
26 Inclination
27 Blade or vane profile
28 Coupling region
29 Coupling member
30 First holding contour
31 Second holding contour
32 Cooling duct structure of 10
33 Outlet port
34 Cooling duct structure of 5, 7
35 Sealing structure
36 Fastening While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A turbomachine comprising:
   a rotor having at least one moving blade row with a plurality of moving blades;
   a stator having at least one guide vane row with a plurality of guide vanes;
   at least in one of at least one moving blade row and at least one guide vane row, all the blades or vanes each having a shroud plate;
   a securing device securing each shroud plate to an associated blade or vane axially, circumferentially, or both, against relative adjustment;
   wherein the shroud plates are separate components from the respective blade or vane and are mounted on the respective blade or vane to be radially movable with respect to said blade or vane;
   wherein circumferentially adjacent shroud plates are directly coupled to one another for the transmission of tensile forces in the circumferential direction; and
   wherein the shroud plates are configured and arranged to form a self-supporting annularly closed ring when the turbo machine is rotating;
   wherein each shroud plate is mounted on an associated blade or vane to be fixed axially, fixed circumferentially with respect to an associated blade or vane, or both;
   wherein each shroud plate includes a securing orifice and each securing device has at least one securing member which is arranged radially movably on a respective blade or vane;
   wherein each shroud plate contains, for each securing member, at least one desecuring orifice through which the securing member can be driven out of the securing orifice and into the associated blade or vane.

2. The turbomachine as claimed in claim 1, wherein adjacent shroud plates, in the region of their mutual coupling, in the circumferential direction are positively or non-positively in engagement with one another, or are fastened to one another.

3. The turbomachine as claimed in claim 1, wherein each shroud plate, on its circumferential end regions, includes a first holding contour at one end and a second holding contour at the other end; and
   wherein, in a mounted state, the first holding contour of each shroud plate is in engagement with the second holding contour of each adjacent shroud plate for the transmission of tensile forces.

4. The turbomachine as claimed in claim 3, wherein the first holding contour of each shroud plate is in engagement positively or non-positively with the second holding contour of each adjacent shroud plate for the transmission of tensile forces.

5. The turbomachine as claimed in claim 1, wherein each shroud plate contains cooling duct structures for cooling the shroud plate when the turbomachine is in operation, which cooling duct structures, when in a mounted state of the shroud plate, communicate with cooling duct structures of an associated blade or vane.

6. The turbomachine as claimed in claim 1, wherein each shroud plate includes, on a side facing away from an associated blade or vane, a sealing structure configured and arranged to axially seal the blade or vane row when the turbomachine is in operation.

7. The turbomachine as claimed in claim 1, wherein the shroud plates are configured and arranged so that, in the mounted state, each of the shroud plates is coupled to adjacent shroud plates for the transmission of tensile forces in the circumferential direction.

8. The turbomachine as claimed in claim 7, wherein said turbomachine comprises a turbine or a compressor.

9. The turbomachine as claimed in claim 1, wherein said turbomachine comprises a turbine or a compressor.

10. The turbomachine as claimed in claim 1, wherein each shroud plate is nondestructively, releasably mounted on an associated blade or vane.

11. The turbomachine as claimed in claim 1, wherein each securing member, at least when the turbomachine is in operation, penetrates radially into the securing orifice.

12. The turbomachine as claimed in claim 1, wherein each securing member includes and is prestressed by a securing spring for penetration into the securing orifice.

13. The turbomachine as claimed in claim 1, wherein each securing member comprises a bolt.

* * * * *